US012462427B2

(12) United States Patent
Perreault

(10) Patent No.: US 12,462,427 B2
(45) Date of Patent: Nov. 4, 2025

(54) ACCURATE CAMERA-DISPLAY CALIBRATION FOR TELEPRESENCE VIDEOCONFERENCING

(71) Applicant: GOOGLE LLC, Mountain View, CA (US)

(72) Inventor: John D. Perreault, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/262,813

(22) PCT Filed: Sep. 1, 2022

(86) PCT No.: PCT/US2022/075813
§ 371 (c)(1),
(2) Date: Jul. 25, 2023

(87) PCT Pub. No.: WO2024/049480
PCT Pub. Date: Mar. 7, 2024

(65) Prior Publication Data
US 2024/0338851 A1    Oct. 10, 2024

(51) Int. Cl.
*H04N 7/15* (2006.01)
*G06T 7/80* (2017.01)
*H04N 13/327* (2018.01)

(52) U.S. Cl.
CPC ............ *G06T 7/80* (2017.01); *H04N 13/327* (2018.05); *G06T 2207/30204* (2013.01); *G06T 2207/30244* (2013.01)

(58) Field of Classification Search
CPC ............ G06T 7/80; G06T 2207/30204; G06T 2207/30244; G06T 2207/30208; H04N 13/327; H04N 7/142; H04N 7/147; H04N 7/15
See application file for complete search history.

(56) References Cited

U.S. PATENT DOCUMENTS 9,684,953 B2 * 6/2017 Kuster .................... H04N 7/15
10,841,537 B2 * 11/2020 Valli ..................... H04L 65/403
(Continued)

FOREIGN PATENT DOCUMENTS

CN     113345029 A    9/2021
WO    2021038478 A1   3/2021

OTHER PUBLICATIONS

International Search Report and Written Opinion for PCT Application No. PCT/US2022/075813, mailed on Mar. 30, 2023, 17 pages.
(Continued)

*Primary Examiner* — Howard D Brown, Jr.
(74) *Attorney, Agent, or Firm* — Brake Hughes Bellermann LLP

(57) ABSTRACT

Techniques of calibrating telepresence videoconferencing displays and cameras include providing 6 DoF camera locations and orientation vectors in display reference frame based on a plurality of images that indicate specified mirror-plane points of a mirror and specified reflected display plane points. In some implementations, the specified mirror-plane points are located at fiducial markers printed on the mirror. In some implementations, the specified reflected display plane points are located in a checkerboard pattern of fiducial markers on the display.

20 Claims, 7 Drawing Sheets

(56) References Cited

U.S. PATENT DOCUMENTS

| | | | |
|---|---|---|---|
| 2010/0128105 A1* | 5/2010 | Halavy | H04N 7/147 348/14.05 |
| 2012/0120184 A1* | 5/2012 | Fornell | H04N 7/147 348/E7.083 |
| 2014/0085501 A1* | 3/2014 | Tran | H04N 7/12 348/222.1 |
| 2019/0108683 A1* | 4/2019 | Valli | G06T 19/003 |
| 2021/0021748 A1* | 1/2021 | Cutler | H04N 5/208 |
| 2021/0021784 A1* | 1/2021 | Cutler | H04N 23/45 |
| 2021/0021785 A1* | 1/2021 | Cutler | G02B 27/0172 |

OTHER PUBLICATIONS

Jones, Andrew, et al., "Achieving Eye Contact in a One-to-Many 3D Video Teleconferencing System", ACM Transactions on Graphics, vol. 28, No. 3, Article 64;, Aug. 2009, 8 pages.

Kumar, Ram Krishan, et al., "Simple Calibration of Non-Overlapping Cameras With a Mirror", IEEE;, 2008, 7 pages.

Rodrigues, Rui, et al., "Camera Pose Estimation Using Images of Planar Mirror Reflections", ECCV 2010, Part IV, LNC 6314; Springer-Verlag Berlin Heidelberg;, 2010, pp. 382-395.

Santo, Hiroaki, et al., "Light Structure From Pin Motion: Geometric Point Light Source Calibration", International Journal of Computer Vision (2020) 128;, Mar. 13, 2020, 1889-1912.

Sturm, Peter, et al., "How to Compute the Pose of an Object Without a Direct View?", ACCV 2006, LNCS 3852;, 2006, 11 pages.

Takahashi, Kosuke, et al., "A New Mirror-Based Extrinsic Camera Calibration Using an Orthogonality Constraint", IEEE, https://ieeexplore.ieee.org/document/6247783, 2012, pp. 1051-1058.

Takahashi, Kosuke, et al., "Camera Calibration Based on Mirror Reflections", IPSJ SIG Technical Report;, 2018, 16 pages.

* cited by examiner

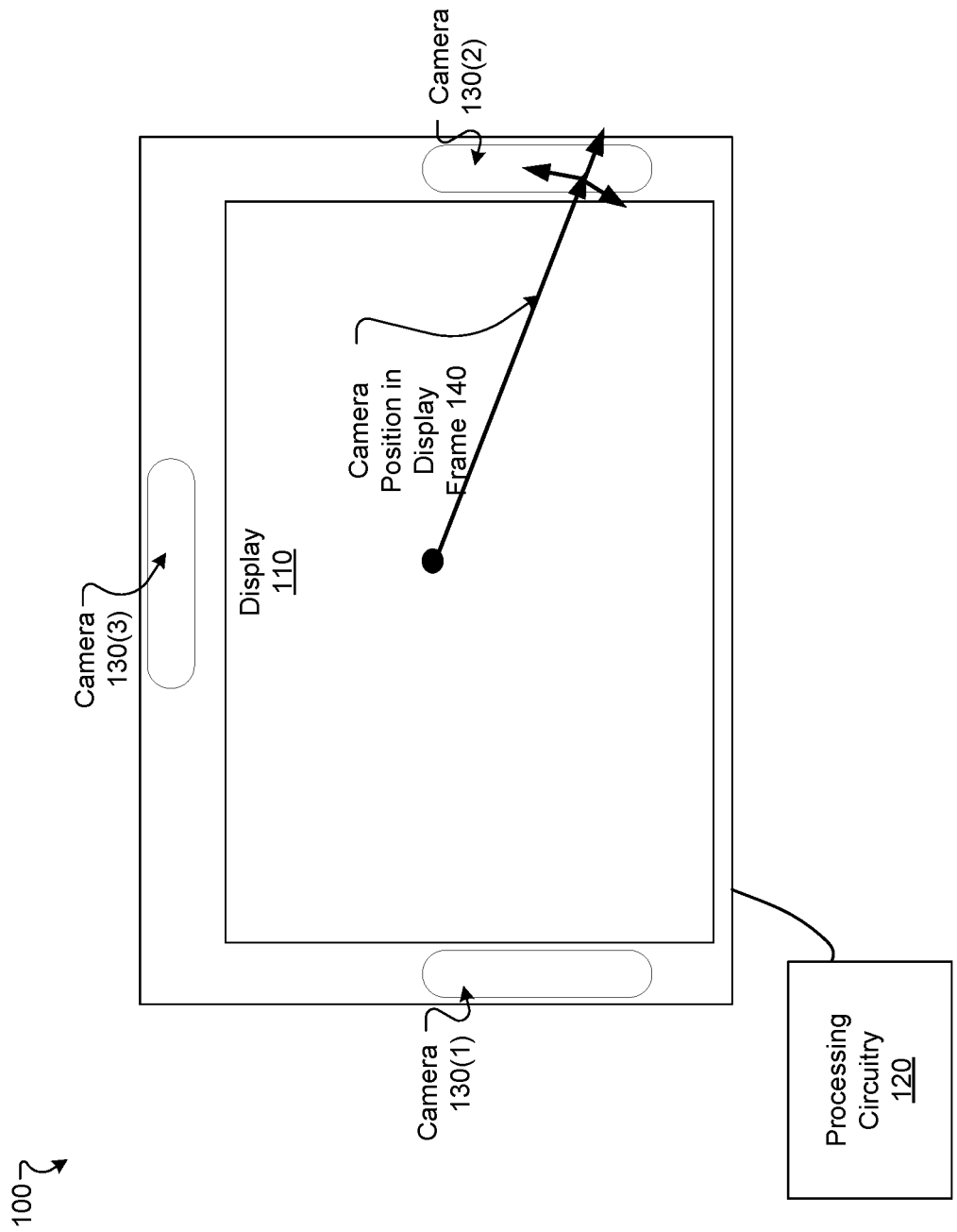

ACCURATE CAMERA-DISPLAY CALIBRATION FOR TELEPRESENCE VIDEOCONFERENCING

CROSS REFERENCE TO RELATED APPLICATION

This application is a 35 U.S.C. § 371 National Phase Entry Application from PCT/US2022/075813, filed Sep. 1, 2022, designating the U.S., the disclosure of which is incorporated herein by reference in its entirety.

BACKGROUND

Telepresence refers to any set of technologies which allow a person to feel as if they were present, at a place other than their true location. Telepresence may involve a user's senses interact with specific stimuli, e.g., visual, auditory, tactile, olfactory, etc. In applications such as telepresence videoconferencing, visual and auditory stimuli are considered.

SUMMARY

Implementations described herein are related to calibrating cameras for accurate user eye location within a stereoscopic three-dimensional (3D) display for telepresence videoconferencing. Because stereoscopic 3D displays interleave pixels for left and right eyes, it is desired to have an accurate estimate of a user's eyes with respect to the display pixels. Such an accurate measure of the location of a user's eyes within the display requires measurement of the six degrees of freedom (6 DoF), i.e., three positional and three orientation coordinates of a camera-display transformation. Herein a method is provided in which 6 DoF camera locations and orientation vectors in a display reference frame are determined based on a plurality of images that indicate specified mirror-plane points of a mirror and specified reflected display plane points. In some implementations, the specified mirror-plane points are located at fiducial markers printed on the mirror. In some implementations, the specified reflected display plane points are located in a checkerboard pattern of fiducial markers on the display In one general aspect, a method can include receiving image data representing a plurality of images, each of the plurality of images indicating (i) a specified point in a plane of a mirror held at a respective mirror pose of a plurality of mirror poses with respect to a camera and (ii) a specified point in a virtual image display plane, the virtual image display plane including an image of a display. The method can also include determining a position and orientation of the camera in a reference frame of the display based on the specified point in the plane of the mirror and the specified point in the virtual image display plane. The method can further include causing an image on the display to be presented to a user according to the determined position and orientation of the camera.

In another general aspect, a computer program product comprises a non-transitory storage medium, the computer program product including code that, when executed by processing circuitry, causes the processing circuitry to perform a method. The method can include receiving image data representing a plurality of images, each of the plurality of images indicating (i) a specified point in a plane of a mirror held at a respective mirror pose of a plurality of mirror poses with respect to a camera and (ii) a specified point in a virtual image display plane, the virtual image display plane including an image of a display. The method can also include determining a position and orientation of the camera in a reference frame of the display based on the specified point in the plane of the mirror and the specified point in the virtual image display plane. The method can further include causing an image on the display to be presented to a user according to the determined position and orientation of the camera.

The details of one or more implementations are set forth in the accompanying drawings and the description below. Other features will be apparent from the description and drawings, and from the claims.

BRIEF DESCRIPTION OF THE DRAWINGS

FIG. 1A illustrates a front view of an example telepresence videoconference system, in accordance with implementations described herein.

DETAILED DESCRIPTION

Figure 1B:
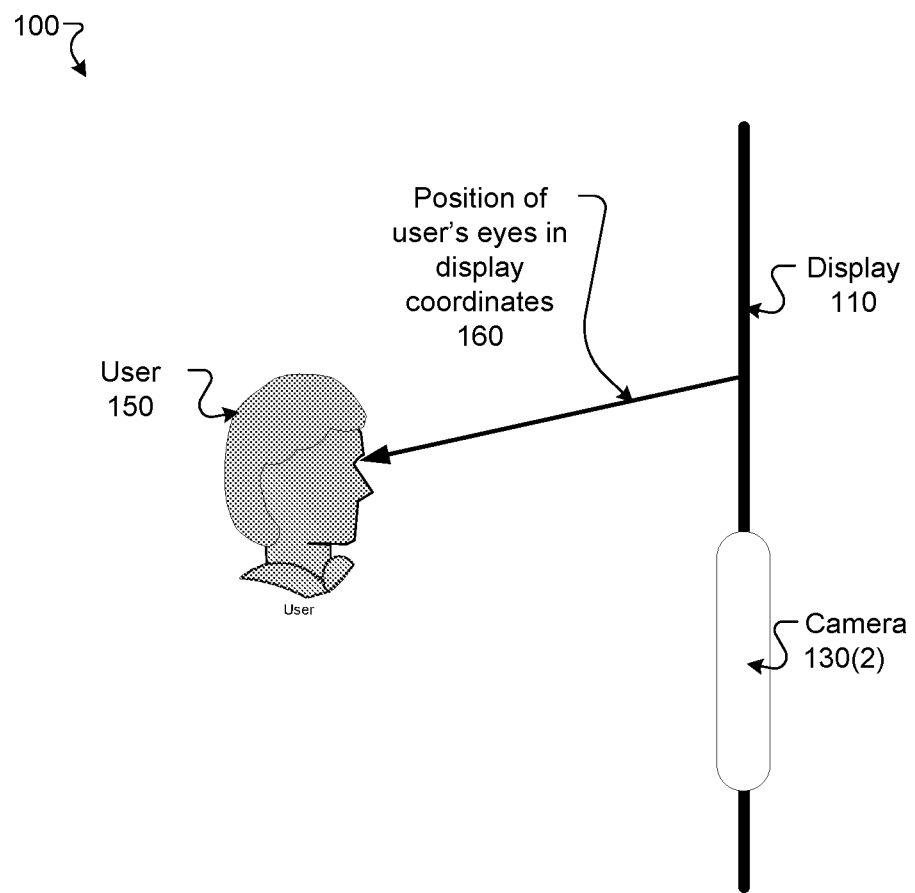
FIG. 1B is a side view of the example telepresence videoconference system, in accordance with implementations described herein.

This disclosure relates to expanding access to and improving telepresence technology. Telepresence refers to any set of technologies which allow a person to feel as if they were present, at a place other than their true location. Telepresence may involve a user's senses interact with specific stimuli, e.g., visual, auditory, tactile, olfactory, etc. In applications such as telepresence videoconferencing, just visual and auditory stimuli are considered.

A telepresence videoconferencing system 100 is illustrated in FIG. 1A. The system 100 includes a monitor 110 on which three cameras 130(1-3) are arranged. As shown in FIG. 1A, the system 100 is fixed within a room occupied by the user facing the monitor 110. The user facing the monitor sees a fellow participant of a telepresence videoconference. In some implementations, the image on the monitor 110 seen by the user is configured such that the fellow participant appears to be occupying the room with the user. For example, the cameras 130 (1-3) may provide images of the user from different perspectives (e.g., angles); such information may be used to provide depth imaging information. Coupling the depth imagine information with texture information may be used to simulate a three-dimensional image of the user in a space occupied by the fellow participant of the telepresence videoconference.

The monitor 110 may include a stereoscopic three-dimensional display. Stereoscopic 3D displays present a 3D image to an observer by sending a slightly different perspective view to each of an observer's two eyes, to provide an immersive experience to the observer. The visual system of an observer may process the two perspective images so as to interpret an image containing a perception of depth by invoking binocular stereopsis so the observer can see the image in 3D. Some stereoscopic displays send stereo images to each of a left eye and a right eye of an observer over left and right channels, respectively.

Because of the stereo imagery used to create an interpretation of depth, it is desired to achieve an accurate measure of a user's eyes relative to display coordinates. Such an accurate measure of the location of a user's eyes within the display requires measurement of the six degrees of freedom (6 DoF), i.e., three positional and three orientation coordinates of a camera-display transformation. To achieve this, conventional telepresence videoconference displays provide an estimate of the 6 DoF camera-display transformation.

A technical problem with the above-described conventional telepresence videoconference displays is that such estimates provided in the conventional telepresence videoconference displays require empirical head-offset fudge factors not based in any fundamental geometry of the telepresence system. Accordingly, such inaccurate fudge factors result in a reduction of operating head volume when measures are taken to reduce L-R crosstalk.

In accordance with the implementations described herein, a technical solution to the above-described technical problem includes providing 6 DoF camera locations and orientation vectors in display reference frame based on a plurality of images that indicate specified mirror-plane points of a mirror and specified reflected display plane points. In some implementations, the specified mirror-plane points are located at fiducial markers printed on the mirror. In some implementations, the specified reflected display plane points are located in a checkerboard pattern of fiducial markers on the display.

A technical advantage of the technical solution is that the improved telepresence videoconference displays remove the need for empirical head-offset fudge factors, thereby improving accuracy of camera-display calibration and, accordingly, providing a large field over which there is very little tradeoff between operating head volume and L-R crosstalk reduction.

In some implementations, the specified points in the plane of the mirror are located at fiducial markers printed on the mirror.

In some implementations, the fiducial markers are printed on mirror directly using an ultraviolet printer.

In some implementations, the specified points in the virtual image display plane are disposed in a checkerboard pattern of fiducial markers in the virtual image display plane.

In some implementations, receiving the image data includes performing an inversion operation on the checkerboard pattern of fiducial markers to produce an inverted checkerboard pattern. In such implementations, determining the position and orientation of the camera in a reference frame of the display includes recording a position of a specified point disposed in the inverted checkerboard pattern.

In some implementations, determining the position and orientation of the camera in a reference frame of the display includes determining a camera location in the plane of the mirror, the camera location in the plane of the mirror being based on a position of a point in the checkerboard pattern in the virtual image display plane.

In some implementations, the camera location in a plane of the mirror is a constant times the chessboard virtual image point, the constant being based on the specified point in the plane of the mirror, the position of a point in the checkerboard pattern in the virtual image display plane, and an orientation of the mirror.

In some implementations, determining the position and orientation of the camera in a reference frame of the display includes determining a position and an orientation of the display in the plane of the mirror.

In some implementations, determining the position and orientation of the camera in a reference frame of the display includes averaging positions of the camera in the reference frame of the display over the plurality of mirror poses.

In some implementations further comprising averaging rotations of the camera in the reference frame of the display over the plurality of mirror poses, including generating a quarternion projection matrix corresponding to a mirror pose; and computing an eigenfunction corresponding to a largest eigenvalue of the quarternion projection matrix.

FIG. 1A illustrates a front view of an example telepresence videoconference system 100. As shown in FIG. 1A, the telepresence videoconference system 100 includes a display 110, processing circuitry 120, and three camera pods 130 (1-3) each including respective cameras.

The display 110 is a stereoscopic 3D display used in telepresence videoconferencing. Stereoscopic 3D displays present a 3D image to an observer by sending a slightly different perspective view to each of an observer's two eyes, to provide an immersive experience to the observer. The visual system of an observer may process the two perspective images so as to interpret an image containing a perception of depth by invoking binocular stereopsis so the observer can see the image in 3D. Some stereoscopic displays send stereo images to each of a left eye and a right eye of an observer over left and right channels, respectively.

In some implementations, the display 110 is a 3D lightfield display. 3D lightfield displays are stereoscopic displays that produce an autostereoscopic effect that enables an observer to perceive stereoscopic images without the use of special headgear worn by the observer. An example 3D lightfield display uses lenticular optics to provide the autostereoscopic effect. The lenticular optics may be formed as a series of vertically-oriented cylindrical lenses formed on a sheet that is fitted onto a display screen.

The cameras 130(1-3), as shown in FIG. 1A, surround the display 110 on the periphery of the display 110 and face outward from the display 110 to capture an image of a user sitting in front of the display 110. The cameras record images of the user from different perspectives and may form an aggregate image that is three-dimensional or highly resolved for display to another user.

Because the display 110 is a stereoscopic 3D display, it is desired to accurately locate the user's eyes in the display. This implies that the camera position 140 and orientation in the display 110 is carefully calibrated. To this effect, processing circuitry 120 is configured to perform this calibration and determine accurate locations of the camera, say, 130(1) in the display 110.

One way to perform calibration is to use a mirror to show display contents to the camera. Locations on the mirror may be indicated using fiducial marks, and locations on the image of the display in the mirror may be indicated using fiducial marks arranged in a checkerboard pattern. This is discussed in further detail in FIGS. 4-7.

FIG. 1B is a side view of the example telepresence videoconference system 100. The side view of the system 100 shows a user 150 sitting in front of the display 110. The camera 130(2), when properly calibrated, accurately records the position 160 of the user's eyes within the display, i.e., in display coordinates. For example, the improved telepresence videoconference display 110 has a geocal (geometric camera calibration) accuracy level of less than 2 mm, as opposed to 15-25 mm levels of inaccuracy with conventional telepresence videoconference displays.

It is understood that by "accuracy" herein it is meant static, i.e., time-independent error, determined by geocal fidelity. This is in contrast to dynamic accuracy determined by system latency and is not addressed herein. One source of the inaccuracy, or error, may be due to different style of mirror movement during calibration which is suspected to cause systematic errors in a tracker camera pose.

Figure 2:
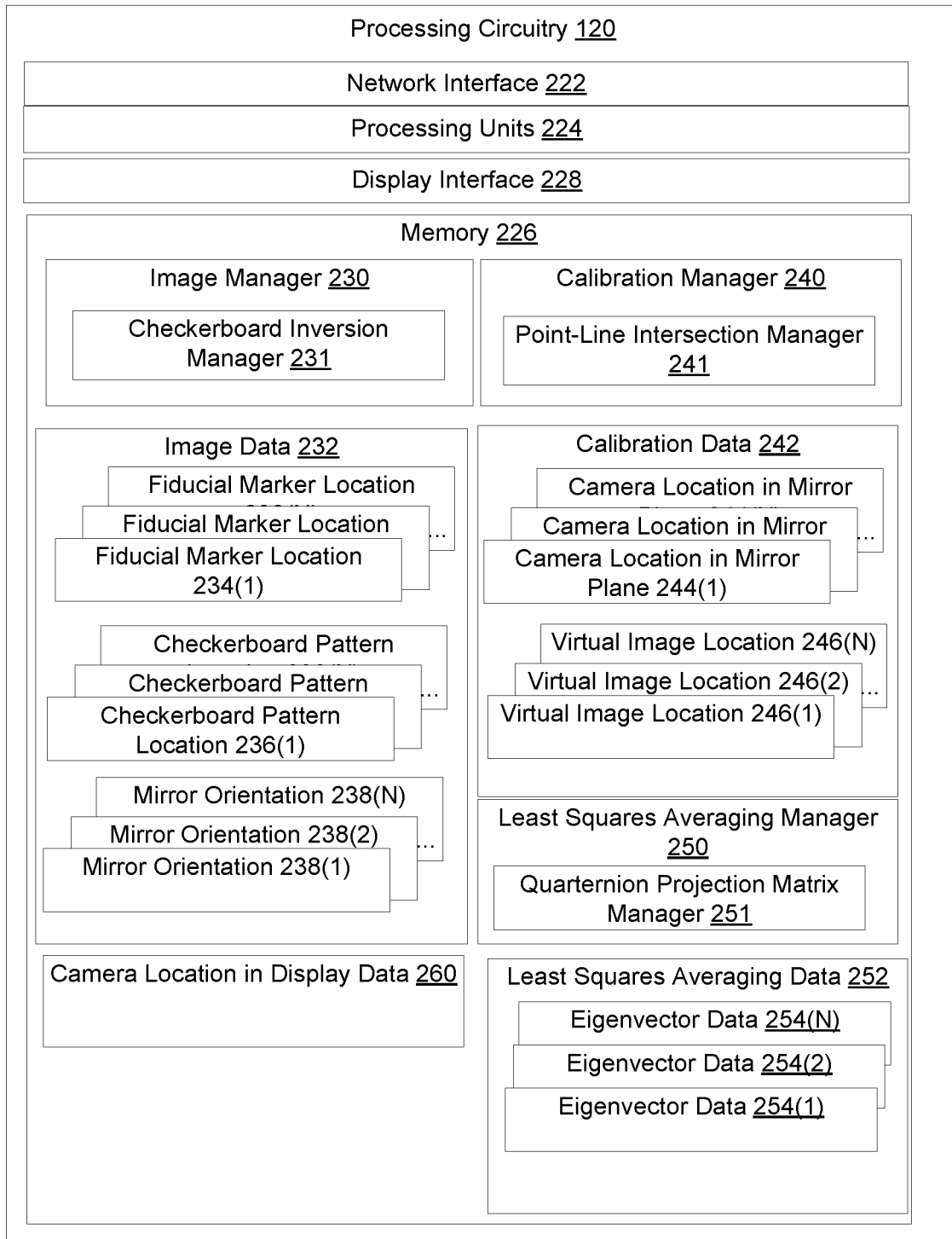
FIG. 2 is a diagram illustrating example processing circuitry configured to determine camera position and orientation in a stereoscopic 3D display.

FIG. 2 is a diagram that illustrates an example of the processing circuitry 120. The processing circuitry 120 includes a network interface 222, one or more processing units 224, and nontransitory memory 226. The network interface 222 includes, for example, Ethernet adaptors, Token Ring adaptors, and the like, for converting electronic and/or optical signals received from the network to electronic form for use by the processing circuitry 120. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form processing circuitry, which is configured and arranged to carry out various methods and functions as described herein.

In some implementations, one or more of the components of the processing circuitry 120 can be, or can include processors (e.g., processing units 224) configured to process instructions stored in the memory 226. Examples of such instructions as depicted in FIG. 2 include an image manager 230, a calibration manager 240, and a least squares averaging manager 250. Further, as illustrated in FIG. 2, the memory 226 is configured to store various data, which is described with respect to the respective managers that use such data.

The image manager 230 is configured to obtain image data 232. In some implementations, the image manager 230 obtains the image data 232 over a network via the network interface 222. In some implementations, the image manager 230 obtains the image data 232 over a direct connection. In some implementations, the image manager 230 obtains the image data 232 from a local storage device.

The image data 232 represents images of the display 110 in a mirror at particular poses. The image data 232 is used by the calibration manager 240 to determine an accurate position and orientation of a camera (e.g., camera 130(2)) in the display reference frame, i.e., display coordinates. Each image of the image data represents a particular pose of the mirror held up to the camera. An example image of the display in a mirror is shown in FIG. 4.

Figure 4:
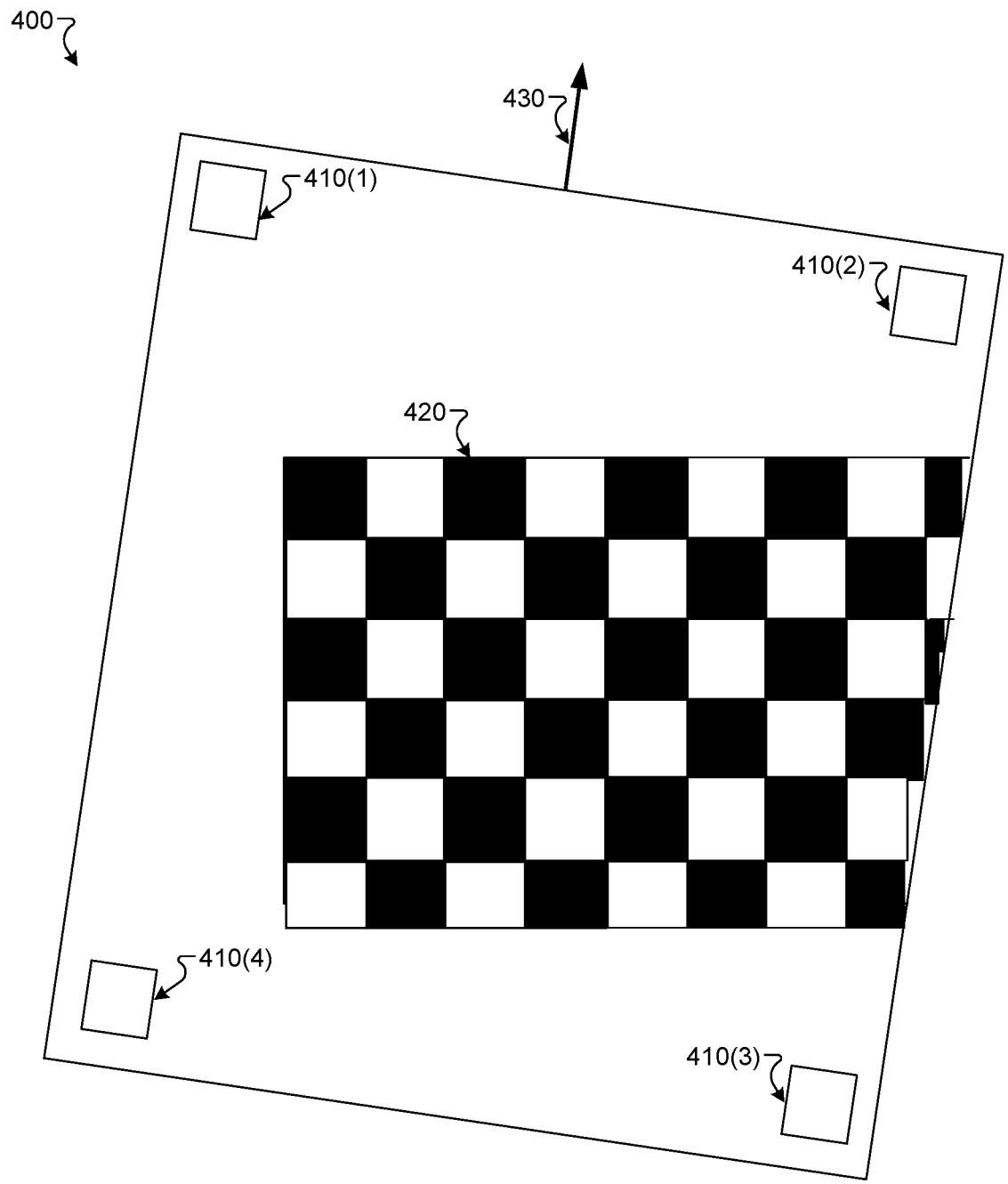
FIG. 4 is a diagram that illustrates an example mirror with fiduciary marks reflecting an image of a checkerboard pattern of fiduciary marks on the stereoscopic 3D display.

FIG. 4 is a diagram that illustrates an example mirror 400 with fiduciary marks 410(1-4) reflecting an image of a checkerboard pattern 420 of fiduciary marks on a stereoscopic 3D display (e.g., display 110).

In generating the images, it is assumed that the camera (e.g., camera 130(2)) has undergone direct-view geocal intrinsic calibration with a printed chart. Further, it is assumed that lighting, camera focus, exposure time, signal-to-noise ratio (SNR), and motion have been optimized for sharp images of the mirror markers and display.

In some implementations, the fiduciary markers 410(1-4) are square ArUco markers. An ArUco marker is a synthetic square marker composed by a wide black border and an inner binary matrix which determines its identifier. The black border facilitates its fast detection in the image and the binary codification allows its identification and the application of error detection and correction techniques. The marker size determines the size of the internal matrix. For instance a marker size of 4×4 is composed by 16 bits. It is noted that a marker can be found rotated in the environment; the detection process, however, should be able to determine its original rotation so that each corner may be identified unequivocally. This may also be done based on the binary codification.

In some implementations, the ArUco markers are printed directly on the mirror 400 substrate using an ultraviolet (UV) printer. An example of such a UV printer is a Hewlett-Packard (HP) Scitex FB550, supporting 1200×600, 600× 600, and 600×300 dots per inch (DPI). In some implementations, the substrate is flat down to 1 wavelength per inch, implying <a 5 nm plane deviation across a 12-in mirror. In some implementations, the mirror is a 300 mm semiconductor wafer.

In some implementations, the checkerboard pattern 420 of fiduciary marks on the display (e.g., display 110) is a ChArUco pattern. ArUco markers and boards are very useful due to their fast detection and their versatility. However, one of the problems of ArUco markers is that the accuracy of their corner positions is not too high, even after applying subpixel refinement. In contrast, the corners of chessboard patterns can be refined more accurately since each corner is surrounded by two black squares. However, finding a chessboard pattern is not as versatile as finding an ArUco board: it has to be completely visible and occlusions are not permitted. A ChArUco pattern combines the benefits of these two approaches. The ArUco part is used to interpolate the position of the chessboard corners, so that it has the versatility of marker boards, since it allows occlusions or partial views. Moreover, since the interpolated corners belong to a chessboard, they are very accurate in terms of subpixel accuracy.

Returning to FIG. 2, the image data 232 includes, as shown in FIG. 2, a plurality of fiducial marker locations 234(1 . . . N) (e.g., ArUco marker locations), where N is the number of poses represented in the image data 232. Each of the fiducial marker location, e.g., 234(1), includes locations of four markers at each corner of the mirror 400 (or a square inscribed in a circular mirror in the case of a 300 mm semiconductor wafer). The four markers of each pose are then used by the calibration manager 240 to compute the 6 DoF pose of the mirror relative to camera coordinates, i.e., camera frame of reference $[R_{mirror}^{camera}, T_{mirror}^{camera}]$, where R is an orientation vector and T is a translation (position) vector.

The image data 232 also includes, as shown in FIG. 2, a plurality of checkerboard pattern locations 236(1 . . . N), e.g., the ChArUco pattern marker locations. Each of the checkerboard pattern locations, e.g., 236(1), includes locations of each of the fiducial marker corners in the checkerboard pattern locations 236(1 . . . N). These locations are then used by the calibration manager 240 to compute the 6 DoF pose of the virtual image of the display relative to the camera coordinates, i.e., camera frame of reference $[R_{virtual}^{camera}, T_{virtual}^{camera}]$.

In some implementations, the image manager 230 includes a checkerboard inversion manager 231. The checkerboard inversion manager 231 is configured to invert, i.e., flip along an axis in the plane of the mirror 400, the checkerboard pattern locations 236(1 . . . N) for detection. Once the locations are detected by the image manager 230, the checkerboard inversion manager 231 is configured to reverse the flip along the axis in the plane of the mirror 400 for recording virtual checkerboard pattern 420 image points.

The image data 232 also includes, as show in in FIG. 2, a plurality of mirror orientations 238(1 ... N). Each mirror orientation, e.g., 238(1) indicates a direction of a normal to the mirror plane facing outward from the mirror surface. In some implementations, the plurality of mirror orientations 238(1 ... N) are determined from the plurality of fiducial marker locations 234(1 ... N).

The calibration manager 240 is configured to determine a position and orientation of the camera, e.g., 130(2) in a reference frame of the display 110 based on the image data 232. In some implementations, the calibration manager 240 performs intermediate computations based on the image data 232 to generate calibration data 242, which calibration data 242 is used to generate the position and orientation of the camera, e.g., 130(2) in a reference frame of the display 110. As shown in FIG. 2, the calibration data includes a plurality of camera locations in the mirror plane 244(1 ... N) $T_{mirror}^{camera}$ and a plurality of virtual image locations 246(1 ... N) $T_{virtual}^{camera}$.

The calibration manager 240 is also configured to estimate a point of reflection on the mirror; such an estimation is used, in some implementations, to perform subsequent reflection transformations. Such an estimation is illustrated in FIG. 5.

Figure 5:
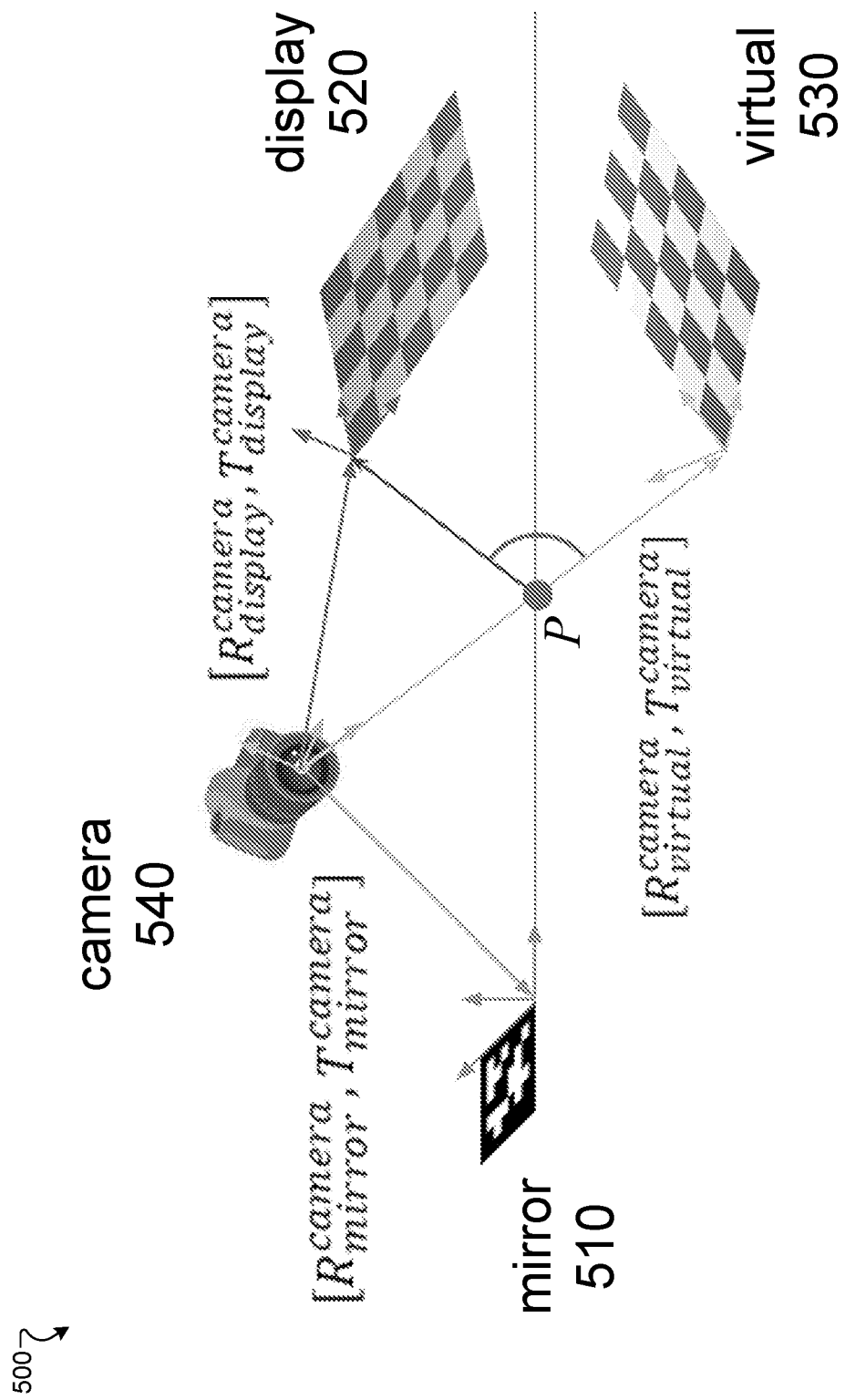
FIG. 5 is a diagram illustrating an example geometry for determining camera location and orientation in the mirror, virtual image, and display.

FIG. 5 is a diagram illustrating an example geometry 500 for determining point of reflection $T_{reflection}^{camera}$ in the mirror 510, virtual image 530, and display 520, given the image data 232. The point of reflection may be computed by solving the line-plane intersection problem as follows:

$$T_{reflection}^{camera} = T_{virtual}^{camera} + d \frac{T_{virtual}^{camera}}{|T_{virtual}^{camera}|}.$$

The point of reflection $T_{reflection}^{camera}$ is located along the virtual image according to the distance d, which is given by ($\hat{n}$ is the mirror surface normal)

$$d = \frac{(T_{mirror}^{camera} - T_{virtual}^{camera}) \cdot \hat{n}}{\frac{T_{virtual}^{camera}}{|T_{virtual}^{camera}|} \cdot \hat{n}}.$$

That is, the point of reflection $T_{reflection}^{camera}$ in the mirror 510 is a constant times the position of the point in the checkerboard pattern in the virtual image display plane.

The calibration manager 240 is also configured to compute a camera-display position vector. The display position is computed in the mirror frame of reference (i.e., mirror coordinates). Let M be a reflection operation, i.e., $$M = \begin{pmatrix} 1 & 0 & 0 \\ 0 & 1 & 0 \\ 0 & 0 & -1 \end{pmatrix}.$$

Then the display position in the mirror frame of reference is given by $$T_{display}^{mirror} = M R_{camera}^{mirror} (T_{virtual}^{camera} - T_{reflection}^{camera})$$

It is noted that $R_{camera}^{mirror} = (R_{mirror}^{camera})^{-1}$. By vector subtraction, the display in camera coordinates is $$T_{display}^{camera} = R_{mirror}^{camera} (T_{display}^{mirror} - T_{reflection}^{mirror})$$

Figure 6:
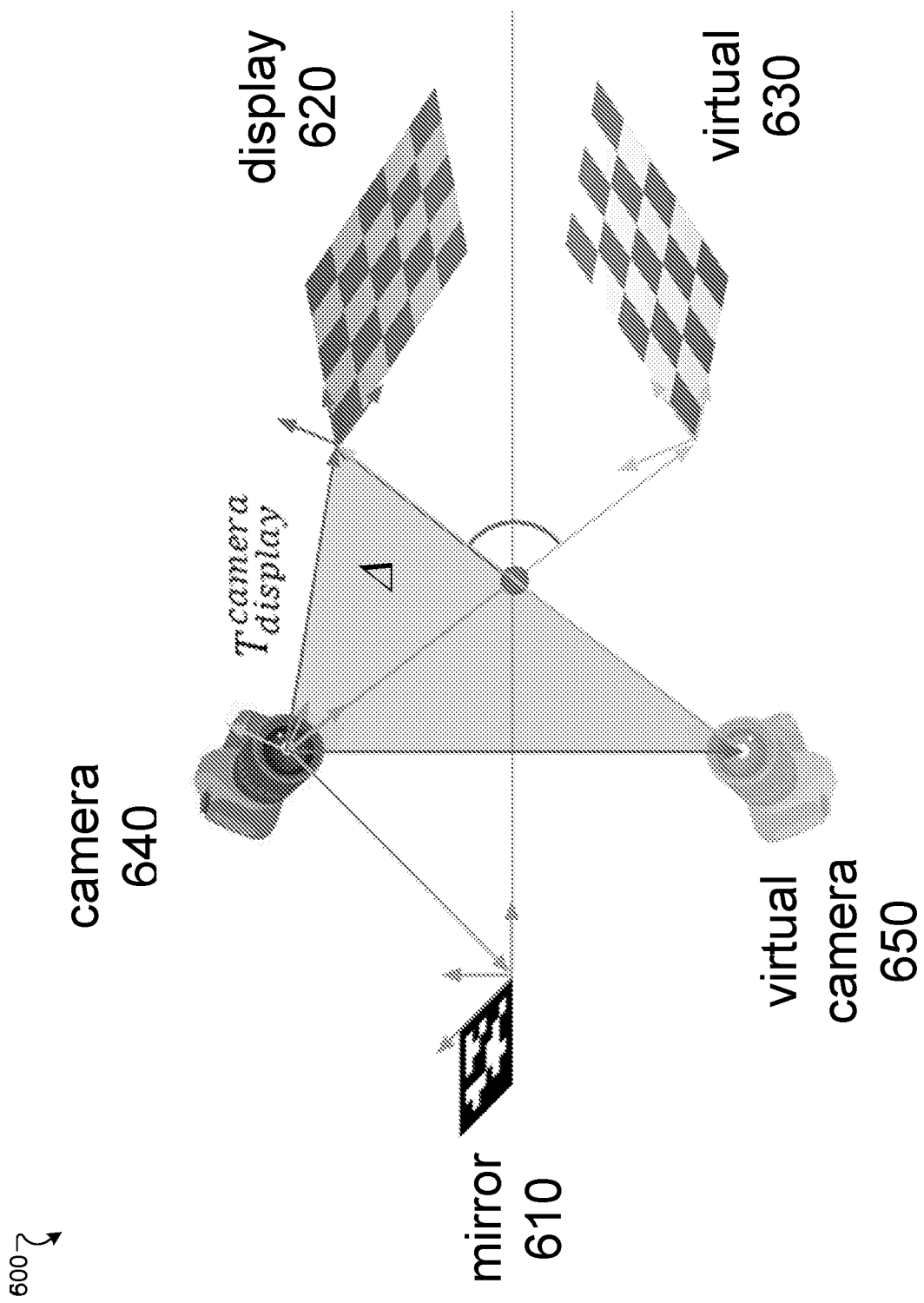
FIG. 6 is a diagram that illustrating an example geometry for determining camera location in the display using a virtual camera that is a reflection of the camera by the mirror.

In some implementations, it is useful to consider the role of a virtual camera, as illustrated in FIG. 6. FIG. 6 is a diagram that illustrating an example geometry for determining camera 640 location in the display 620 using a virtual camera 650 that is a reflection of the camera by the mirror 610. If the mirror 610 image of the camera 640 is considered, one may imagine a geocal experiment as a virtual camera 650 viewing the physical display from different poses. As shown in FIG. 6, the virtual camera 650 pose is determined from the mirror 610 pose.

Camera-display translation is generated by considering the triangle Δ in FIG. 6. The virtual camera geometry simplifies the vector equation construction and expresses camera-display translation (i.e., camera in display coordinates) explicitly in terms of measured quantities. By substituting the above equations, the camera-display translation is as follows.

$$T_{display}^{camera} = R_{mirror}^{camera} M R_{camera}^{mirror} T_{virtual}^{camera} + 2 R_{mirror}^{camera} \hat{n}\hat{n} R_{camera}^{mirror} T_{mirror}^{camera}$$

where $$\hat{n}\hat{n} = \begin{pmatrix} 0 & 0 & 0 \\ 0 & 0 & 0 \\ 0 & 0 & 1 \end{pmatrix}.$$

Finally, the camera-display orientation rotation matrix for each image of the image data 232 is computed. The reflection operator M is used to reflect the camera-virtual image rotation matrix, but should be applied in a "sandwiching" manner to maintain mirror (i.e., polar) symmetry.

$$R_{display}^{camera} = M R_{camera}^{mirror} R_{virtual}^{camera} R_{mirror}^{camera} M$$

The least squares averaging manager 250 is configured to average camera-display positions over poses to find, as least squares averaging data 252, a least-squares estimate of the camera-display translation vector.

$$T_{display}^{camera} = \frac{1}{N_{poses}} \sum_{mirror\ poses} T_{display}^{camera}(\text{mirror pose})$$

In contrast, rotation vector and/or matrix estimates cannot be averaged to find a "mean" camera-base rotation vector. Nevertheless, one may find a rotation matrix estimate (3 DoF) that minimizes a Frobenius norm, subject to a unitary constraint.

$$\min \sum_{mirror\ pose} \left\| R_{display}^{camera} - R_{display}^{camera}(\text{mirror pose}) \right\|_F^2$$

$$R_{display}^{camera} R_{camera}^{display} = 1$$

In some implementations, the least squares estimate of the rotation matrix may be computed using quarternions. Advantages of using quarternions include avoiding iterative nonlinear optimizers and getting stuck in local minima during gradient descent. The quarternion that minimizes the least square error is the eigenvector (e.g., eigenvector data 254(1 . . . N)) corresponding to the maximum eigenvalue of the quarternion projection matrix Q 251. It is noted that the ith quarternion $q_i$ is constructed for each mirror pose using a Rodrigues vector definition.

$$Q = \frac{1}{N_{poses}} \sum_{i=1}^{N_{poses}} q_i q_i^T$$

The final result is the camera location in display coordinate data 260 [$R_{camera}^{display}$, $T_{camera}^{display}$]. The effect of this 6 DoF data is to cause an image on the display to be presented to a user according to this determined position and orientation of the camera.

The components (e.g., modules, processing units 224) of processing circuitry 120 can be configured to operate based on one or more platforms (e.g., one or more similar or different platforms) that can include one or more types of hardware, software, firmware, operating systems, runtime libraries, and/or so forth. In some implementations, the components of the processing circuitry 120 can be configured to operate within a cluster of devices (e.g., a server farm). In such an implementation, the functionality and processing of the components of the processing circuitry 120 can be distributed to several devices of the cluster of devices.

The components of the processing circuitry 120 can be, or can include, any type of hardware and/or software configured to process attributes. In some implementations, one or more portions of the components shown in the components of the processing circuitry 120 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the processing circuitry 120 can be, or can include, a software module configured for execution by at least one processor (not shown). In some implementations, the functionality of the components can be included in different modules and/or different components than those shown in FIG. 2, including combining functionality illustrated as two components into a single component.

Although not shown, in some implementations, the components of the processing circuitry 120 (or portions thereof) can be configured to operate within, for example, a data center (e.g., a cloud computing environment), a computer system, one or more server/host devices, and/or so forth. In some implementations, the components of the processing circuitry 120 (or portions thereof) can be configured to operate within a network. Thus, the components of the processing circuitry 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search system can be, or can include, processors configured to process instructions stored in a memory. For example, image manager 230 (and/or a portion thereof), a calibration manager 240 (and/or a portion thereof), and a least squares averaging manager 250 (and/or a portion thereof are examples of such instructions.

In some implementations, the memory 126 can be any type of memory such as a random-access memory, a disk drive memory, flash memory, and/or so forth. In some implementations, the memory 226 can be implemented as more than one memory component (e.g., more than one RAM component or disk drive memory) associated with the components of the processing circuitry 120. In some implementations, the memory 226 can be a database memory. In some implementations, the memory 226 can be, or can include, a non-local memory. For example, the memory 226 can be, or can include, a memory shared by multiple devices (not shown). In some implementations, the memory 226 can be associated with a server device (not shown) within a network and configured to serve the components of the processing circuitry 120. As illustrated in FIG. 2, the memory 226 is configured to store various data, including image data 232 and image calibration data 242.

Figure 3:
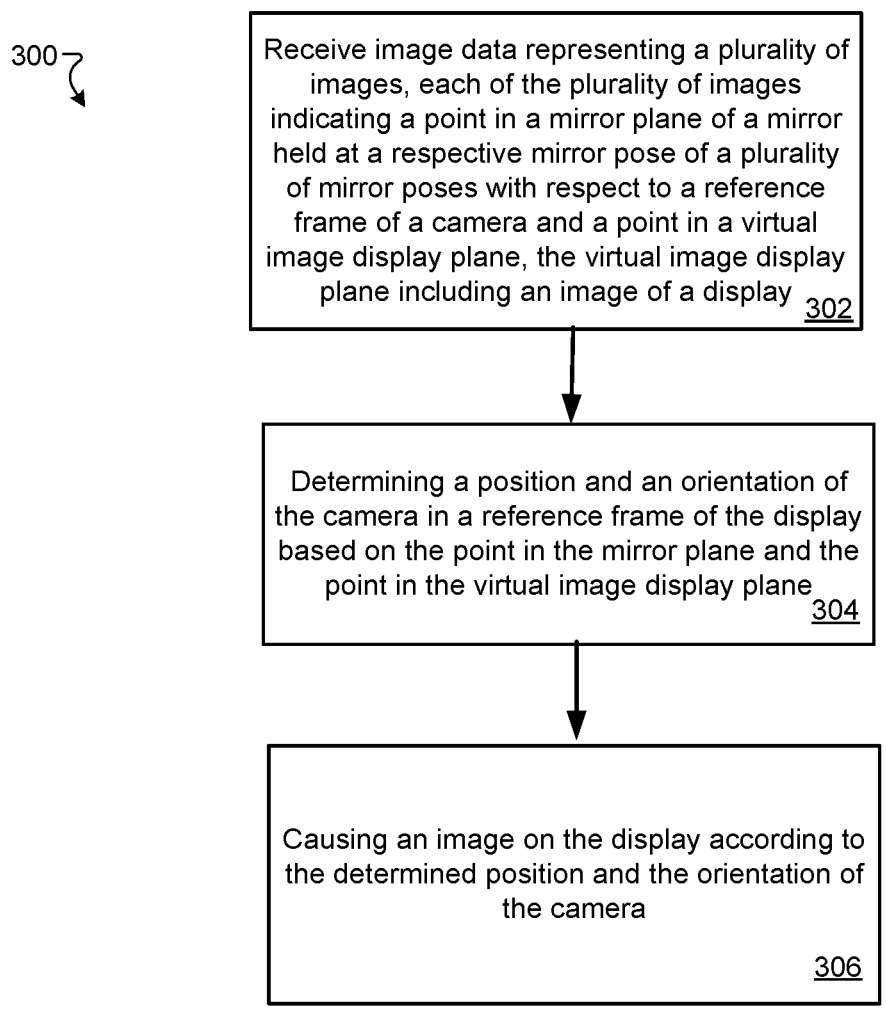
FIG. 3 is a flow chart illustrating an example method of determining camera position and orientation in a stereoscopic 3D display.

FIG. 3 is a flow chart depicting an example method 300 of producing corrected wavefronts for image calibration. The method 300 may be performed by software constructs described in connection with FIG. 2, which reside in memory 226 of the processing circuitry 120 and are run by the set of processing units 224.

At 302, the image manager 230 receives image data (232) representing a plurality of images, each of the plurality of images indicating (i) a specified point in a plane of a mirror held at a respective mirror pose of a plurality of mirror poses with respect to a camera (e.g., 130(2)) and (ii) a specified point in a virtual image display plane, the virtual image display plane including an image of a display (110).

At 304, the calibration manager 240 determines a position and orientation of the camera in a reference frame of the display based on the specified point in the plane of the mirror and the specified point in the virtual image display plane.

At 306, the processing circuitry 120 causes an image on the display to be presented to a user according to the determined position and orientation of the camera.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving image data representing a plurality of images, each of the plurality of images indicating (i) a specified point in a plane of a mirror held at a respective mirror pose of a plurality of mirror poses with respect to a camera and (ii) a specified point in a virtual image display plane, the virtual image display plane including an image of a display;
   determining a position and orientation of the camera in a reference frame of the display based on the specified point in the plane of the mirror and the specified point in the virtual image display plane; and
   causing an image on the display to be presented to a user according to the determined position and orientation of the camera.

2. The method as in claim 1, wherein the specified point in the plane of the mirror is located at a fiducial marker printed on the mirror.

3. The method as in claim 2, wherein the fiducial marker is printed on mirror directly using an ultraviolet printer.

4. The method as in claim 1, wherein the specified point in the virtual image display plane is disposed in a checkerboard pattern of fiducial markers in the virtual image display plane.

5. The method as in claim 4, wherein receiving the image data includes:
   performing an inversion operation on the checkerboard pattern of fiducial markers to produce an inverted checkerboard pattern, and
   wherein determining the position and orientation of the camera in a reference frame of the display includes:
      recording a position of a specified point disposed in the inverted checkerboard pattern.

6. The method as in claim 4, wherein determining the position and orientation of the camera in a reference frame of the display includes:
   determining a camera location in the plane of the mirror, the camera location in the plane of the mirror being based on a position of a point in the checkerboard pattern in the virtual image display plane.

7. The method as in claim 6, wherein the camera location in a plane of the mirror is a constant times the position of the point in the checkerboard pattern in the virtual image display plane, the constant being based on the specified point in the plane of the mirror, the position of a point in the checkerboard pattern in the virtual image display plane, and an orientation of the mirror.

8. The method as in claim 1, wherein determining the position and orientation of the camera in a reference frame of the display includes:
   determining a position and an orientation of the display in the plane of the mirror.

9. The method as in claim 1, wherein determining the position and orientation of the camera in a reference frame of the display includes:
   averaging positions of the camera in the reference frame of the display over the plurality of mirror poses.

10. The method as in claim 9, further comprising averaging rotations of the camera in the reference frame of the display over the plurality of mirror poses, including:
    generating a quarternion projection matrix corresponding to a mirror pose; and
    computing an eigenfunction corresponding to a largest eigenvalue of the quarternion projection matrix.

11. A computer program product comprising a nontransitory storage medium, the computer program product including code that, when executed by processing circuitry, causes the processing circuitry to perform a method, the method comprising:
    receiving image data representing a plurality of images, each of the plurality of images indicating (i) a specified point in a plane of a mirror held at a respective mirror pose of a plurality of mirror poses with respect to a camera and (ii) a specified point in a virtual image display plane, the virtual image display plane including an image of a display;
    determining a position and orientation of the camera in a reference frame of the display based on the specified point in the plane of the mirror and the specified point in the virtual image display plane; and
    causing an image on the display to be presented to a user according to the determined position and orientation of the camera.

12. The computer program product as in claim 11, wherein the specified point in the plane of the mirror is located at a fiducial marker printed on the mirror.

13. The computer program product as in claim 12, wherein the fiducial marker is printed on mirror directly using an ultraviolet printer.

14. The computer program product as in claim 11, wherein the specified point in the virtual image display plane are disposed in a checkerboard pattern of fiducial markers in the virtual image display plane.

15. The computer program product as in claim 14, wherein receiving the image data includes:
    performing an inversion operation on the checkerboard pattern of fiducial markers to produce an inverted checkerboard pattern, and
    wherein determining the position and orientation of the camera in a reference frame of the display includes:
       recording a position of a specified point disposed in the inverted checkerboard pattern.

16. The computer program product as in claim 14, wherein determining the position and orientation of the camera in a reference frame of the display includes:
    determining a camera location in the plane of the mirror, the camera location in the plane of the mirror being based on a position of a point in the checkerboard pattern in the virtual image display plane.

17. The computer program product as in claim 16, wherein the camera location in a plane of the mirror is a constant times the position of the point in the checkerboard pattern in the virtual image display plane, the constant being based on the specified point in the plane of the mirror, the position of a point in the checkerboard pattern in the virtual image display plane, and an orientation of the mirror.

18. The computer program product as in claim 11, wherein determining the position and orientation of the camera in a reference frame of the display includes:
   determining a position and an orientation of the display in the plane of the mirror.

19. The computer program product as in claim 11, wherein determining the position and orientation of the camera in a reference frame of the display includes:
   averaging positions of the camera in the reference frame of the display over the plurality of mirror poses.

20. The computer program product as in claim 19, further comprising averaging rotations of the camera in the reference frame of the display over the plurality of mirror poses, including:
   generating a quarternion projection matrix corresponding to a mirror pose; and
   computing an eigenfunction corresponding to a largest eigenvalue of the quarternion projection matrix.

\* \* \* \* \*